(12) United States Patent
Kimura et al.

(10) Patent No.: US 8,220,249 B2
(45) Date of Patent: Jul. 17, 2012

(54) ROCKET NOZZLE AND CONTROL METHOD FOR COMBUSTION GAS FLOW IN ROCKET ENGINE

(75) Inventors: Tatsuya Kimura, Aichi-ken (JP); Yoshihiro Kawamata, Aichi-ken (JP); Kenichi Niu, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1097 days.

(21) Appl. No.: 12/200,265

(22) Filed: Aug. 28, 2008

(65) Prior Publication Data

US 2009/0235639 A1 Sep. 24, 2009

(30) Foreign Application Priority Data

Mar. 18, 2008 (JP) ................................. 2008-069502

(51) Int. Cl.
*B64G 1/40* (2006.01)
(52) U.S. Cl. ................ 60/204; 60/231; 60/246; 60/257; 60/265; 239/265.17
(58) Field of Classification Search .............. 60/231, 60/246, 257, 265, 205, 200.1, 204; 239/265.17
See application file for complete search history.

(56) References Cited

U.S. PATENT DOCUMENTS

| | | | | |
|---|---|---|---|---|
| 3,212,259 A | * | 10/1965 | Kepler | 60/231 |
| 3,394,549 A | * | 7/1968 | Sutor | 60/770 |
| 3,469,787 A | | 9/1969 | Marsh et al. | |
| 3,487,643 A | * | 1/1970 | Colombani | 60/245 |
| 3,698,642 A | * | 10/1972 | McCullough | 60/231 |
| 3,925,982 A | * | 12/1975 | Mueller | 239/265.17 |
| 4,947,644 A | | 8/1990 | Hermant | |
| 5,012,640 A | * | 5/1991 | Mirville | 60/246 |
| 5,067,316 A | * | 11/1991 | Bonniot | 60/263 |

FOREIGN PATENT DOCUMENTS

JP 64-41651 A 2/1989
WO 98/12429 A1 3/1998

OTHER PUBLICATIONS

Japanese Office Action dated Apr. 15, 2010, issued in corresponding Japanese Patent Application No. 2008-069502.
Chinese Office Action dated Jul. 6, 2010, issued in corresponding Chinese Patent Application No. 200810214930.1.
G. Hagemann et al. "A Critical Assessment of Dual-Bell Nozzles", American Institute of Aeronautics and Astronautics, Inc. 1997.

* cited by examiner

*Primary Examiner* — Ehud Gartenberg
*Assistant Examiner* — Lorne Meade
(74) *Attorney, Agent, or Firm* — Westerman, Hattori, Daniels & Adrian, LLP

(57) ABSTRACT

A rocket nozzle includes a dual-bell nozzle and a gas introducing section configured to introduce gas into space surrounded by the dual-bell nozzle. Combustion gas flows in the space. The dual-bell nozzle includes a first stage nozzle bell-shaped and surrounding an upstream portion of the space, and a second stage nozzle bell-shaped and surrounding a downstream portion of the space. The dual-bell nozzle has an inflection point between the first stage nozzle and the second stage nozzle. The gas introducing section includes a gas inlet provided to an inner wall surface of the first stage nozzle. The gas is introduced into the space from the gas inlet.

5 Claims, 8 Drawing Sheets

ROCKET NOZZLE AND CONTROL METHOD FOR COMBUSTION GAS FLOW IN ROCKET ENGINE

INCORPORATION BY REFERENCE

This application is based on Japanese Patent Application No. 2008-069502. The disclosure thereof is incorporated herein by reference.

BACKGROUND OF THE INVENTION

1. Field of the Invention

The present invention relates to a rocket nozzle and a control method for combustion gas flow in a rocket engine.

2. Description of Related Art

FIG. 1 shows a bell-shaped nozzle 100A as a rocket nozzle. When a flow path cross-sectional area at a throat 101A is At and a flow path cross-sectional area at a nozzle exit 102A is A1, an expansion ratio eA of the bell-shaped nozzle 100A is represented by a ratio (A1/At) between A1 and At. FIG. 2 shows a bell-shaped nozzle 100B as a rocket nozzle. When a flow path cross-sectional area at a throat 101B is At and a flow path cross-sectional area at a nozzle exit 102B is A2, an expansion ratio eB of the bell-shaped nozzle 100B is represented by a ratio (A2/At). Here, A2 is greater than A1, and thus eB is greater than eA.

A specific impulse representing a performance of a rocket nozzle is known. The specific impulse varies depending on the expansion ratio and the ambient pressure around the rocket nozzle. Accordingly, the specific impulse changes during the ascent of a rocket.

FIG. 3 is a graph showing changes of specific impulses with respect to altitude. A vertical axis of the graph represents specific impulse and a horizontal axis represents altitude. A performance curve 121 shows the change of a specific impulse of the bell-shaped nozzle 100A with respect to altitude. A performance curve 122 shows the change of a specific impulse of the bell-shaped nozzle 100B with respect to altitude.

The performance curve 121 and the performance curve 122 intersect each other at a certain altitude. The specific impulse of the bell-shaped nozzle 100A is greater than the specific impulse of the bell-shaped nozzle 100B at an altitude lower than the altitude of intersection, and the specific impulse of the bell-shaped nozzle 100B is greater than the specific impulse of the bell-shaped nozzle 100A at an altitude higher than the altitude of intersection.

If an expansion ratio of a rocket nozzle can be changed during the ascent of a rocket, a specific impulse of the rocket nozzle can be kept high over a wide range of altitude.

FIG. 4 shows a dual-bell nozzle 110 as a rocket nozzle. The dual-bell nozzle 110 includes a first stage nozzle 115 as a portion from a throat 111 to an inflection point 112 and a second stage nozzle 116 as a portion from the inflection point 112 to a nozzle exit 113. Each of the first stage nozzle 115 and the second stage nozzle 116 is bell-shaped. Here, a flow path cross-sectional area at the throat 111 is represented by At, a flow path cross-sectional area at the inflection point 112 is represented by A1, and a flow path cross-sectional area at the nozzle exit 113 is represented by A2.

As shown in FIG. 5, when the ambient pressure around the dual-bell nozzle 110 is high, a flow of combustion gas separates from an inner wall surface of the dual-bell nozzle 110 at the inflection point 112. Hereinafter, such flow is referred to as a low expansion flow. An expansion ratio of the dual-bell nozzle 110 under the state of the low expansion flow is approximately equal to the expansion ratio of the bell-shaped nozzle 100A.

As shown in FIG. 6, when the ambient pressure around the dual-bell nozzle 110 is low, the flow of the combustion gas separates from the inner wall surface of the dual-bell nozzle 110 at the nozzle exit 113. Hereinafter, such flow is referred to as a high expansion flow. An expansion ratio of the dual-bell nozzle 110 under the state of the high expansion flow is approximately equal to the expansion ratio of the bell-shaped nozzle 100B.

Referring to FIG. 3, it is optimum that the combustion gas flow in the dual-bell nozzle 110 transits from the low expansion flow state to the high expansion flow state at the altitude corresponding to the intersection of the performance curve 121 and the performance curve 122. The intersection of the performance curve 121 and the performance curve 122 is referred to as an optimum transition point 120. However, as described in "A Critical Assessment of Dual-Bell Nozzles", G. Hagemann, M. Frey, and D. Manski, 1997, it is known that the combustion gas flow in the dual-bell nozzle 110 transits from the low expansion flow state to the high expansion flow state at an altitude much lower than the altitude corresponding to the optimum transition point 120. For that reason, the change of the specific impulse of the dual-bell nozzle 110 with respect to altitude is represented by a performance curve 123.

Since the state of the combustion gas flow in the dual-bell nozzle 110 transits at the altitude much lower than the optimum transition point 120, the specific impulse of the dual-bell nozzle 110 is reduced at the transition. The lower the altitude at which the transition occurs is, the larger the magnitude of the reduction of the specific impulse becomes. In addition, vibration would be strong because the combustion gas flow tends to separate from an inner wall surface of the second stage nozzle 116 at an upstream position from the nozzle exit 113 when the altitude is low immediately after the transition.

SUMMARY

An object of the present invention is to provide a rocket nozzle and a control method for combustion gas flow in a rocket engine in which a state of combustion gas flow appropriately transits.

In a first aspect of the present invention, a rocket nozzle includes a dual-bell nozzle, and a gas introducing section configured to introduce gas into space surrounded by the dual-bell nozzle. Combustion gas flows in the space. The dual-bell nozzle includes a first stage nozzle bell-shaped and surrounding an upstream portion of the space, and a second stage nozzle bell-shaped and surrounding a downstream portion of the space. The dual-bell nozzle has an inflection point between the first stage nozzle and the second stage nozzle. The gas introducing section includes a first gas inlet provided to a first inner wall surface of the first stage nozzle. The gas is introduced into the space from the first gas inlet.

In a second aspect of the present invention, a control method for combustion gas flow in a rocket engine includes introducing gas into space surrounded by a dual-bell nozzle. Combustion gas flows in the space. The dual-bell nozzle includes a first stage nozzle bell-shaped and surrounding an upstream portion of the space, and a second stage nozzle bell-shaped and surrounding a downstream portion of the space. The dual-bell nozzle has an inflection point between the first stage nozzle and the second stage nozzle. In the introducing gas step, the gas is introduced into the space from a first gas inlet provided to a first inner wall surface of the first stage nozzle.

According to the present invention, a rocket nozzle and a control method for combustion gas flow in a rocket engine in which a state of combustion gas flow appropriately transits are provided.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF THE PREFERRED EMBODIMENTS

Hereinafter, a rocket nozzle and a control method for combustion gas flow in a rocket engine according to embodiments of the present invention will be described with reference to the accompanying drawings.
(First Embodiment)

Figure 1:
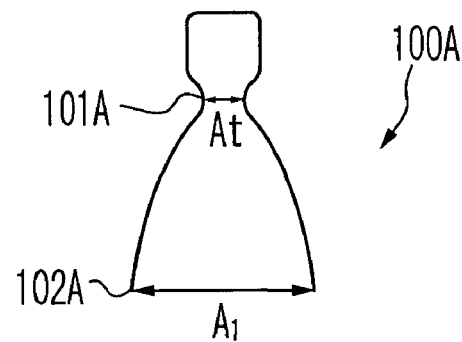
FIG. 1 shows a bell-shape nozzle with a low expansion ratio.
Figure 2:
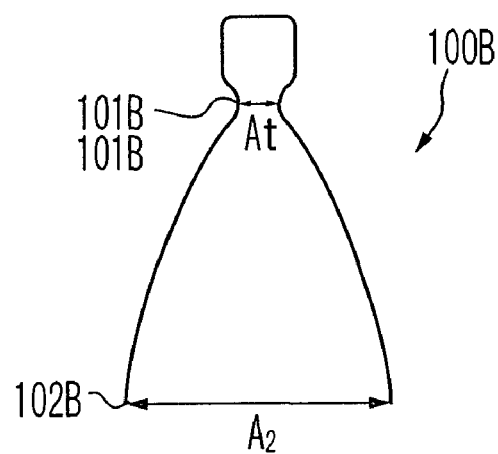
FIG. 2 shows a bell-shape nozzle with a high expansion ratio.
Figure 3:
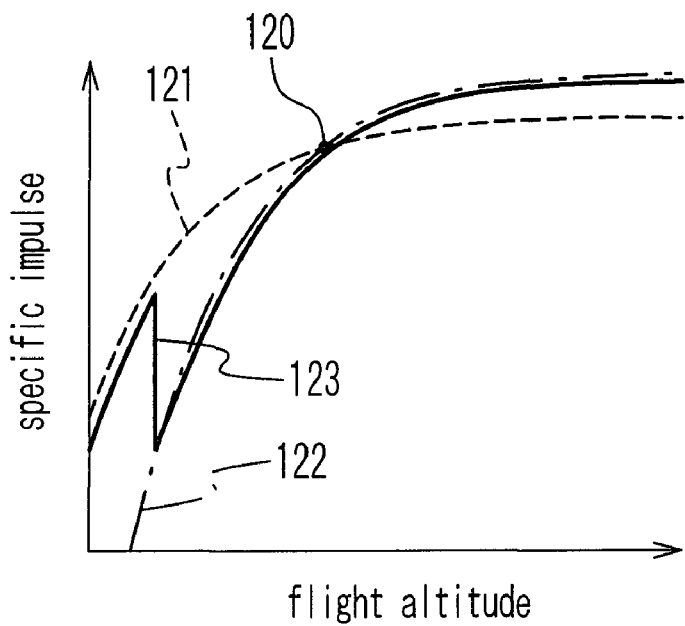
FIG. 3 is a graph comparing the nozzles in relation between specific impulse and altitude.
Figure 4:
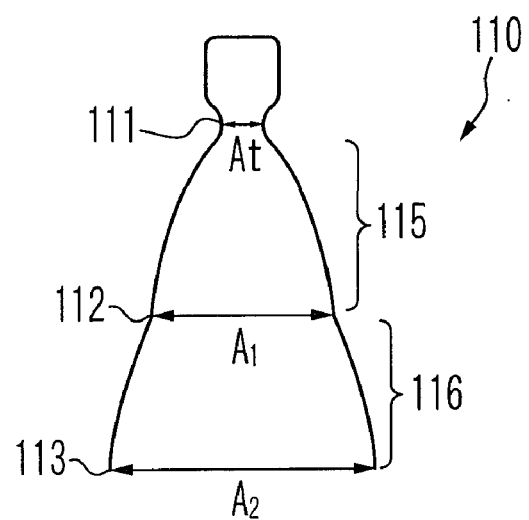
FIG. 4 shows a dual-bell nozzle.
Figure 5:
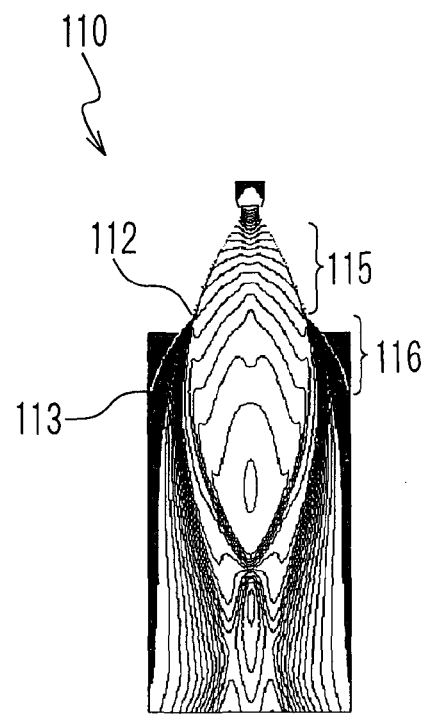
FIG. 5 shows a low expansion flow state of combustion gas flow in the dual-bell nozzle.
Figure 6:
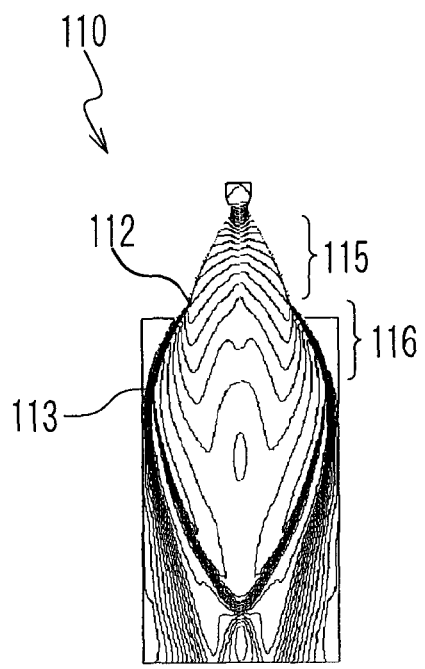
FIG. 6 shows a high expansion flow state of combustion gas flow in the dual-bell nozzle.
Figure 7:
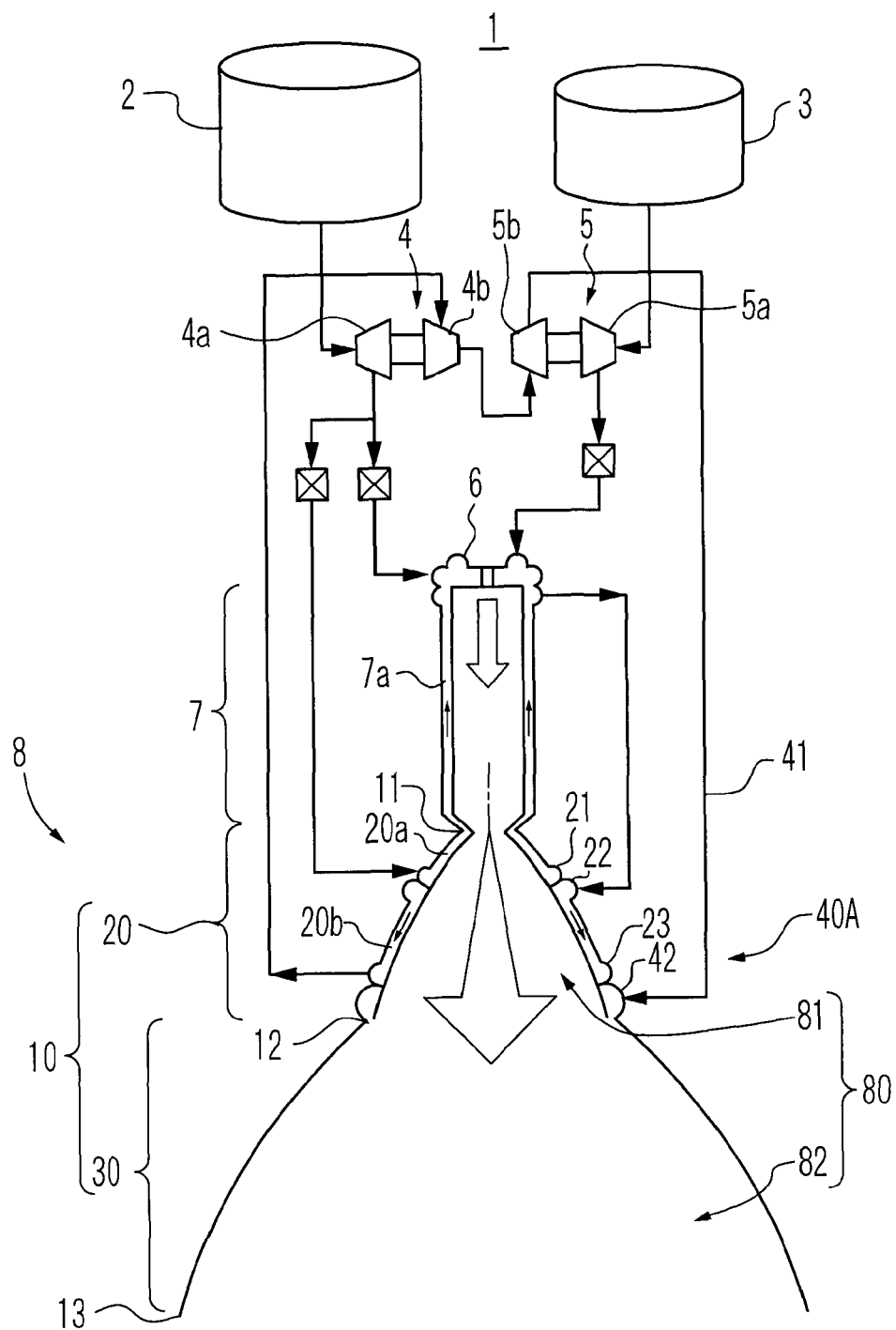
FIG. 7 is a schematic diagram of a rocket engine including a dual-bell nozzle according to a first embodiment of the present invention.

FIG. 7 shows a rocket engine 1 according to a first embodiment of the present invention. The rocket engine 1 includes a fuel tank 2, an oxidizer tank 3, a fuel turbo pump 4, an oxidizer turbo pump 5, and a rocket nozzle 8. The fuel turbo pump 4 includes a pump 4a and a turbine 4b which rotates together with the pump 4a. The oxidizer turbo pump 5 includes a pump 5a and a turbine 5b which rotates together with the pump 5a.

The rocket nozzle 8 includes an injector 6, a combustion chamber 7, a dual-bell nozzle 10, and a gas introducing section 40A. The combustion chamber 7 is provided with a cooling path 7a for cooling a wall surface of the combustion chamber 7. The dual-bell nozzle 10 includes a first stage nozzle 20 as a portion from a throat 11 to an inflection point 12 and a second stage nozzle 30 as a portion from the inflection point 12 to a nozzle exit 13. The inflection point 12 is arranged between the first stage nozzle 20 and the second stage nozzle 30. Each of the first stage nozzle 20 and the second stage nozzle 30 is bell-shaped. The dual-bell nozzle 10 surrounds space 80. The first stage nozzle 20 surrounds an upstream portion 81 of the space 80. The second stage nozzle 30 surrounds a downstream portion 82 of the space 80. The first stage nozzle 20 may be referred to as a base nozzle. The second stage nozzle 30 may be referred to as an expansion nozzle.

Manifolds 21 to 23 are provided along a circumference of the first stage nozzle 20. Each of the manifolds 21 to 23 is doughnut-shaped. A cooling path 20a for cooling a wall surface of the first stage nozzle 20 is provided to a portion of the first stage nozzle 20 between the manifold 21 and the throat 11. The manifold 22 is arranged at a side of the inflection point 12 of the manifold 21 such that the manifold 22 is adjacent to the manifold 21. The manifold 23 is arranged between the manifold 22 and the inflection point 12. A cooling path 20b for cooling the wall surface of the first stage nozzle 20 is provided to a portion of the first stage nozzle 20 between the manifold 22 and the manifold 23.

The gas introducing section 40A includes a piping 41 and a manifold 42 provided along the circumference of the first stage nozzle 20. The manifold 42 is doughnut-shaped. The manifold 42 is arranged at a side of the inflection point 12 of the manifold 23 such that the manifold 42 is adjacent to the manifold 23. The piping 41 connects the oxidizer turbo pump 5 and the manifold 42.

The fuel tank 2 stores fuel such as liquid hydrogen. The oxidizer tank 3 stores oxidizer such as liquid oxygen. The fuel turbo pump 4 supplies the fuel from the fuel tank 2 to the injector 6. The oxidizer turbo pump 5 supplies the oxidizer from the oxidizer tank 3 to the injector 6. The injector 6 mixes the fuel and the oxidizer and injects them into the combustion chamber 7. The injected fuel and oxidizer are ignited to produce combustion gas. The combustion gas flows into the space 80 through the throat 11 from the combustion chamber 7. The combustion gas passes the upstream portion 81 and the downstream portion 82 in this order and outflows from the nozzle exit 13.

The fuel turbo pump 4 supplies the fuel also to the manifold 21 from the fuel tank 2. The fuel enters the manifold 22 from the manifold 21 after passing the cooling path 20a and the cooling path 7a in this order. The fuel enters the manifold 23 through the cooling path 20b from the manifold 22 and is fed to the fuel turbo pump 4 from the manifold 23. The fuel drives the fuel turbo pump 4 and the oxidizer turbo pump 5. The fuel after driving the fuel turbo pump 4 and the oxidizer turbo pump 5 is referred to as turbine exhaust gas. The turbine exhaust gas flows into the manifold 42 through the piping 41. The gas introducing section 40A introduces the turbine exhaust gas into the space 80 to control the combustion gas flow.

Figure 8:
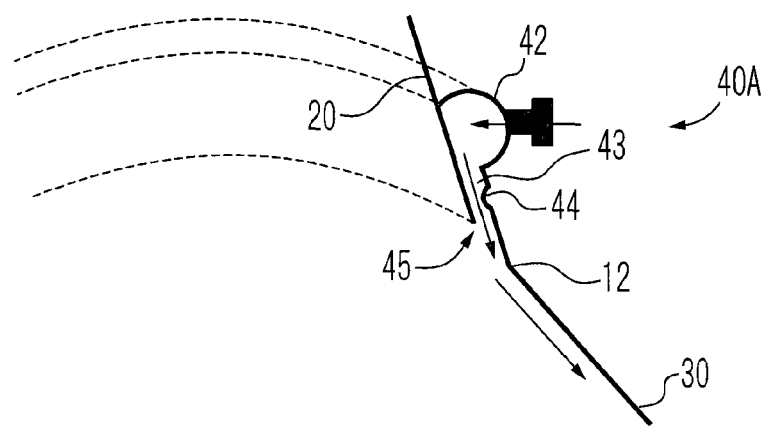
FIG. 8 is an enlarged view of the inflection point of the dual-bell nozzle according to the first embodiment.

Referring to FIG. 8, the gas introducing section 40A includes an inlet 45 provided to an inner wall surface of the first stage nozzle 20 and an introduction path 43 connecting the manifold 42 and the inlet 45. The inlet 45 is arranged at the upstream side of the inflection point 12. The introduction path 43 includes a tapered portion 44 of which a flow path cross-sectional area reduces toward the inlet 45. The turbine exhaust gas having flowed into the manifold 42 is injected into the space 80 from the inlet 45 through the introduction path 43. The turbine exhaust gas is accelerated when passing the tapered portion 44. The inlet 45 injects the turbine exhaust gas as a film-like flow along the inner wall surface of the first stage nozzle 20 toward the inflection point 12.

The turbine exhaust gas being ejected from the inlet 45 as a film-like flow prevents the combustion gas flowing in the space 80 from transiting to the high expansion flow state at an earlier timing (lower altitude) than the optimum point.

An effect of cooling the wall surface of the second stage nozzle 30 by the turbine exhaust gas introduced into the space 80 is also expected.

Figure 9:
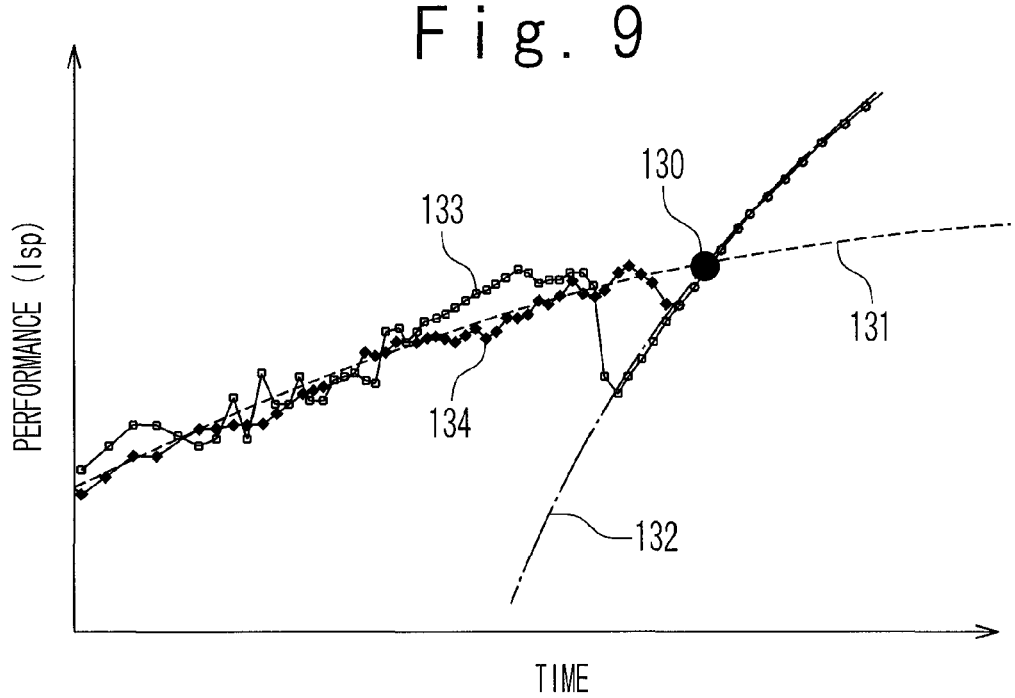
FIG. 9 is a graph for explaining effects of the dual-bell nozzle according to the first embodiment.

Referring to FIG. 9, effects of the present embodiment will be described. FIG. 9 is a graph showing a change with time of a performance (the specific impulse) after a liftoff. A vertical axis of the graph represents the performance (specific impulse) and a horizontal axis represents time from the liftoff. A performance curve 131 shows the change with time of the performance (specific impulse) of the rocket nozzle 8 in case of the low expansion flow state in which the combustion gas flow separates at the inflection point 12. A performance curve 132 shows the change with time of the performance (specific impulse) of the rocket nozzle 8 in case of the high expansion flow state in which the combustion gas flow separates at the nozzle exit 13. It is optimum that the combustion gas flow in the rocket nozzle 8 transits from the low expansion flow state to the high expansion flow state at the timing corresponding to an intersection of the performance curve 131 and the performance curve 132. The intersection of the performance curve 131 and the performance curve 132 is referred to as an optimum transition point 130. A performance curve 133 shows a simulation result of the performance of the rocket nozzle 8 in case that the turbine exhaust gas is not introduced into the space 80 from the inlet 45. A performance curves 134 shows a simulation result of the performance of the rocket nozzle 8 in case that the turbine exhaust gas is introduced into the space 80 from the inlet 45.

By introducing the turbine exhaust gas into the space 80 from the inlet 45, the timing of the transition from the low expansion flow state to the high expansion flow state is delayed and is controlled to be near the optimum transition point 130. When the timing of the transition is controlled to be near the optimum transition point 130, the magnitude of the reduction of the specific impulse at the transition is small and vibration immediately after the transition is suppressed.

(Second Embodiment)

Figure 10:
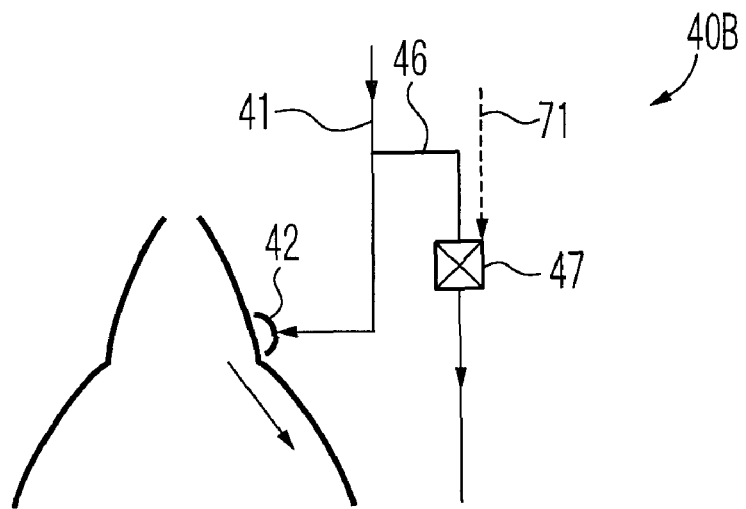
FIG. 10 is a schematic diagram of a dual-bell nozzle according to a second embodiment of the present invention.

A rocket engine 1 according to a second embodiment of the present invention is configured as same as the rocket engine 1 according to the first embodiment except that the gas introducing section 40A is replaced by a gas introducing section 40B. Referring to FIG. 10, the gas introducing section 40B includes, in addition to the piping 41, the manifold 42, the introduction path 43 and the inlet 45 which are described above, an exhaust pipe 46 branched from the piping 41 and a valve 47 provided to the exhaust pipe 46. The valve 47 opens and closes based on a control signal 71. When the valve 47 is open, a part of the turbine exhaust gas from the oxidizer turbo pump 5 is introduced into the space 80 from the inlet 45 and the remaining is exhausted to the atmosphere through the exhaust pipe 46. When the valve 47 is closed, the whole of the turbine exhaust gas from the oxidizer turbo pump 5 is introduced into the space 80 from the inlet 45.

An altitude H of the rocket including the rocket engine 1 is monitored. The rocket lifts off in a state in which the valve 47 is open. After that, the valve 47 is kept open until it is detected that the altitude H exceeds a predetermined altitude H1. For example, the altitude H1 is determined based on an altitude at which the performance curve 133 diverges from the performance curve 131. Since the ambient pressure around the rocket is sufficiently high at the liftoff and immediately after the liftoff, the combustion gas flow is kept in the low expansion flow state even when the flow rate of the turbine exhaust gas introduced into the space 80 from the inlet 45 is small.

The valve 47 closes when it is detected that the altitude H exceeds the altitude H1. After that, the valve 47 is kept closed until it is detected that the altitude H exceeds a predetermined altitude H2. For example, the altitude H2 is determined based on the optimum transition point 130 described above. The altitude H2 is higher than the altitude H1. During the rocket ascent from the altitude H1 to the altitude H2, the flow rate of the turbine exhaust gas introduced into the space 80 from the inlet 45 is controlled to be large. Accordingly, the flow of the combustion gas is kept in the low expansion flow state.

The valve 47 opens when it is detected that the altitude H exceeds the altitude H2. After that, the valve 47 is kept open. The transition of the combustion gas from the low expansion flow state to the high expansion flow state is promoted by opening the valve 47 to reduce the flow rate of the turbine exhaust gas introduced into the space 80 from the inlet 45.

The valve 47 can be closed during a period from the liftoff to the detection of the altitude H exceeding the altitude H1, however, it is expected that the combustion gas flow immediately after the ignition is stabilized by opening the valve 47 to reduce the flow rate of the turbine exhaust gas introduced into the space 80 from the inlet 45.

(Third Embodiment)

Figure 11:
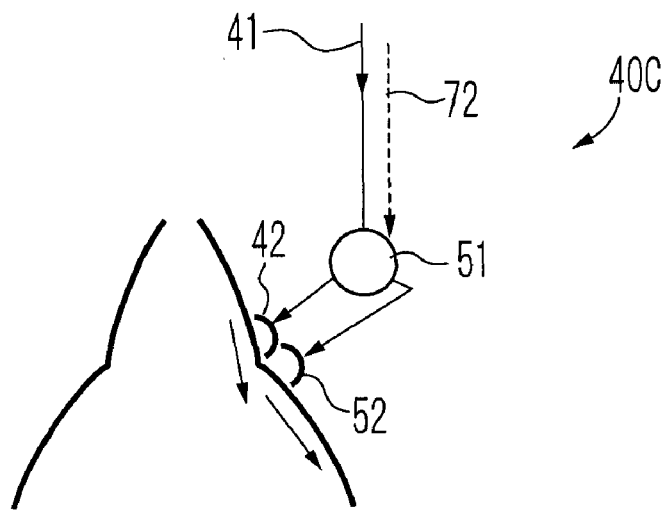
FIG. 11 is a schematic diagram of a dual-bell nozzle according to a third embodiment of the present invention.

A rocket engine 1 according to a third embodiment of the present invention is configured as same as the rocket engine 1 according to the first embodiment except that the gas introducing section 40A is replaced by a gas introducing section 40C. Referring to FIG. 11, the gas introducing section 40C includes, in addition to the piping 41, the manifold 42, the introduction path 43 and the inlet 45 which are described above, a three-way valve 51 provided to the piping 41 and a manifold 52 arranged at a side of the inflection point 12 of the manifold 42 such that the manifold 52 is adjacent to the manifold 42. By switching between the manifold 42 and the manifold 52 based on a control signal 72, the three-way valve 51 connects one of them to the oxidizer turbo pump 5. The turbine exhaust gas from the oxidizer turbo pump 5 flows into the manifold 42 or the manifold 52 depending on a state of the switching of the three-way valve 51.

Figure 12:
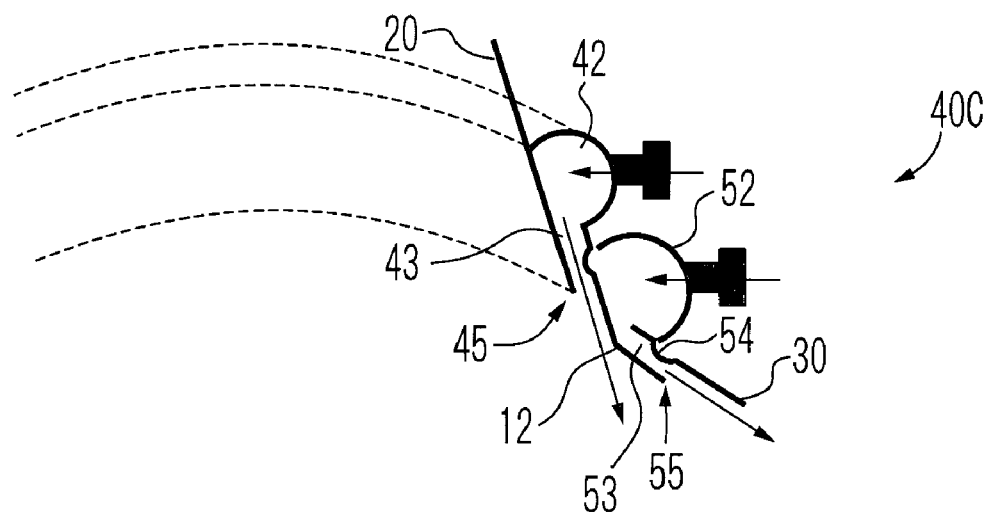
FIG. 12 is an enlarged view of the inflection point of the dual-bell nozzle according to the third embodiment.

Referring to FIG. 12, the manifold 52 is provided along the circumference of the first stage nozzle 20 (or the inflection point 12). The manifold 52 is doughnut-shaped. The gas introducing section 40C includes an inlet 55 provided to the inner wall surface of the second stage nozzle 30 and an introduction path 53 connecting the manifold 52 and the inlet 55. The introduction path 53 includes a tapered portion 54 of which a flow path cross-sectional area reduces toward the inlet 55. The turbine exhaust gas having flowed into the manifold 52 is injected into the space 80 from the inlet 55 through the introduction path 53. The turbine exhaust gas is accelerated when passing the tapered portion 54. The inlet 55 injects the turbine exhaust gas as a film-like flow along the inner wall surface of the second stage nozzle 30 toward the nozzle exit 13.

The altitude H of the rocket is monitored. The rocket lifts off in a state in which the three-way valve 51 connects the manifold 52 and the oxidizer turbo pump 5. When the manifold 52 is connected to the oxidizer turbo pump 5, the inlet 55 is connected to the oxidizer turbo pump 5. The three-way valve 51 keeps connecting the manifold 52 and the oxidizer turbo pump 5 until it is detected that the altitude H exceeds the altitude H1 described above. Since the ambient pressure around the rocket is sufficiently high at the liftoff and immediately after the liftoff, the combustion gas flow is kept in the low expansion flow state even when the turbine exhaust gas is not introduced into the space 80 from the inlet 45 at the upstream side of the inflection point 12.

When it is detected that the altitude H exceeds the altitude H1, the three-way valve 51 switches from the state of connecting the manifold 52 and the oxidizer turbo pump 5 to the state of connecting the manifold 42 and the oxidizer turbo pump 5. After that, the three-way valve 51 keeps the state of connecting the manifold 42 and the oxidizer turbo pump 5 until it is detected that the altitude H exceeds the predetermined altitude H2. When the manifold 42 is connected to the oxidizer turbo pump 5, the inlet 45 is connected to the oxidizer turbo pump 5. During the rocket ascent from the altitude H1 to the altitude H2, the turbine exhaust gas flows from the oxidizer turbo pump 5 to the inlet 45 through the manifold 42 and is introduced into the space 80. Accordingly, the flow of the combustion gas is kept in the low expansion flow state.

When it is detected that the altitude H exceeds the altitude H2, the three-way valve 51 switches from the state of connecting the manifold 42 and the oxidizer turbo pump 5 to the state of connecting the manifold 52 and the oxidizer turbo pump 5. After that, the three-way valve 51 keeps the state of connecting the manifold 52 and the oxidizer turbo pump 5. The transition of the combustion gas from the low expansion flow state to the high expansion flow state is promoted by stopping the introduction of turbine exhaust gas into the space 80 from the inlet 45 with the three-way valve 51. During the rocket ascent above the altitude H2, the turbine exhaust gas flows from the oxidizer turbo pump 5 to the inlet 55 through the manifold 52 and is introduced into the space 80. Accordingly, the inner wall surface of the second stage nozzle 30 is film-cooled.

The three-way valve 51 can be kept in the state of connecting the manifold 42 and the oxidizer turbo pump 5 during a period from the liftoff to the detection of the altitude H exceeding the altitude H1, however, it is expected that the combustion gas flow immediately after the ignition is stabilized by keeping the state of connecting the manifold 52 and the oxidizer turbo pump 5.

(Fourth Embodiment)

A rocket engine 1 according to a fourth embodiment of the present invention is configured as same as the rocket engine 1 according to the first embodiment except that the gas introducing section 40A is replaced by a gas introducing section 40D and that the wall surface of the second stage nozzle 30 is cooled by the fuel before driving the fuel turbo pump 4 and the oxidizer turbo pump 5.

Figure 13:
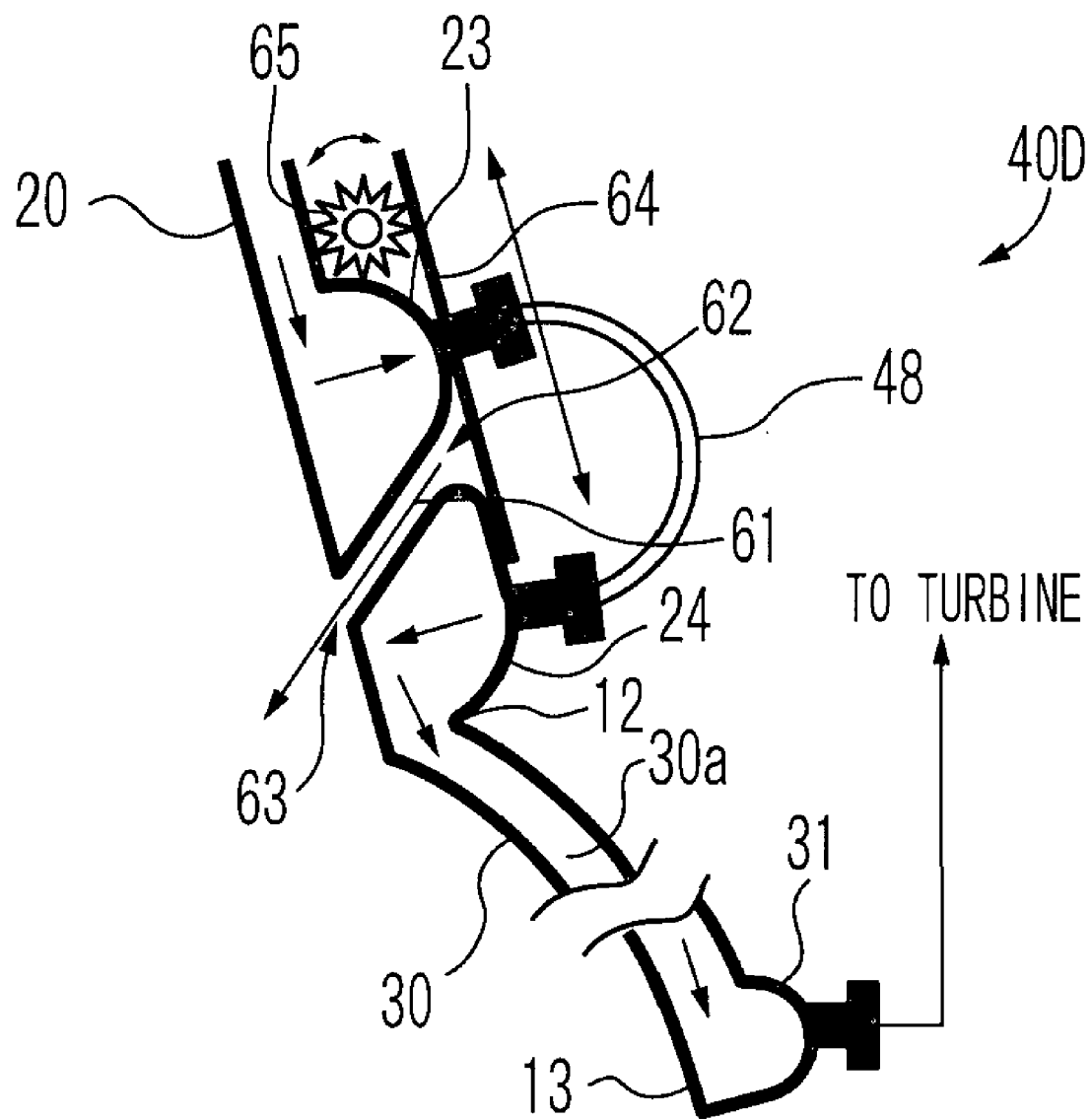
FIG. 13 is a schematic diagram of a dual-bell nozzle according to a fourth embodiment of the present invention.

Referring to FIG. 13, in the rocket engine 1 according to the present embodiment, a manifold 24 is provided along the circumference of the first stage nozzle 20. The manifold 24 is arranged between the manifold 23 and the inflection point 12. The manifold 23 and the manifold 24 are connected each other by a piping 48 provided outside of the dual-bell nozzle 10. A manifold 31 is provided along the nozzle exit 13. Each of the manifolds 24 and 31 is doughnut-shaped. The second stage nozzle 30 is provided with a cooling path 30a for cooling the wall surface of the second stage nozzle 30. The fuel having entered the manifold 23 through the cooling path 20b enters the manifold 24 through the piping 48. Then, the fuel enters the manifold 31 through the cooling path 30a and is fed from the manifold 31 to the turbine 4b of the fuel turbo pump 4. The fuel is exhausted after driving the fuel turbo pump 4 and the oxidizer turbo pump 5.

The gas introducing section 40D includes an air intake 62 provided to an outer wall surface of the first stage nozzle 20, an inlet 63 provided to the inner wall surface of the first stage nozzle 20, an air path 61 connecting the air intake 62 and the inlet 63, a slider 64, and a drive mechanism 65. The slider 64 is driven by the drive mechanism 65 to open and close the air intake 62. The inlet 63 is arranged at the upstream side of the inflection point 12.

The altitude H of the rocket is monitored. The rocket lifts off in a state in which the slider 64 is arranged at a position to close the air intake 62. After that, the slider 64 is kept at the position to close the air intake 62 until it is detected that the altitude H exceeds the altitude H1 described above. Since the ambient pressure around the rocket is sufficiently high at the liftoff and immediately after the liftoff, the combustion gas flow is kept in the low expansion flow state even when air is not introduced into the space 80 from the inlet 63.

When it is detected that the altitude H exceeds the altitude H1, the drive mechanism 65 slides the slider 64 to a position to open the air intake 62. After that, the slider 64 is kept at the position to open the air intake 62 until it is detected that the altitude H exceeds the altitude H2 described above. During the rocket ascent from the altitude H1 to the altitude H2, air is introduced into the space 80 from the inlet 63. Accordingly, the flow of the combustion gas is kept in the low expansion flow state.

When it is detected that the altitude H exceeds the altitude H2, the drive mechanism 65 slides the slider 64 to the position to close the air intake 62. The transition of the combustion gas from the low expansion flow state to the high expansion flow state is promoted, by stopping the introduction of air into the space 80 from the inlet 63.

After that, the slider 64 is kept at the position to close the air intake 62. The combustion gas is prevented from leaking to the outside through the air path 61.

The slider 64 can be kept at the position not to close the air intake 62 during a period from the liftoff to the detection of the altitude H exceeding the altitude H1, however, it is expected that the combustion gas flow immediately after the ignition is stabilized by closing the air intake 62.

The gas introducing section 40D can be applied to a solid-fuel rocket. In the fourth embodiment, the wall surface of the second stage nozzle 30 can be film-cooled.

When the gas introducing sections 40A to 40D are applied to a rocket including clustered engines, it is easy to synchronize the transition timings for the plurality of engines. As the result, an attitude control of the rocket including the clustered engines is stabilized.

In addition, the gas introducing sections 40A to 40D are effective in reentry of the rocket into the atmosphere.

In the second to fourth embodiments, the transition timing can be controlled more precisely by controlling, based on the altitude H of the rocket, the flow rate of the gas introduced into the space 80 from the inlet 45 or 63 provided to the inner wall surface of the first stage nozzle 20.

The above embodiments can be expressed as follows. In the following description, numerals are added to indicate the corresponding examples in the drawings.

A rocket nozzle includes a dual-bell nozzle (10) and a gas introducing section (40A, 40B, 40C, 40D) configured to introduce gas into space (80) surrounded by the dual-bell nozzle. Combustion gas flows in the space. The dual-bell nozzle includes a first stage nozzle (20) bell-shaped and surrounding an upstream portion (81) of the space, and a second stage nozzle (30) bell-shaped and surrounding a downstream portion (82) of the space. The dual-bell nozzle has an inflection point (12) between the first stage nozzle and the second stage nozzle. The gas introducing section includes a first gas inlet (45, 63) provided to a first inner wall surface of the first stage nozzle. The gas is introduced into the space from the first gas inlet.

It is preferable that turbine exhaust gas after driving a turbo pump (4, 5) is used as the gas.

It is preferable that the first gas inlet injects the gas as a film-like flow along the first inner wall surface.

It is preferable that the gas introducing section includes a first manifold (42) provided along a circumference of the first stage nozzle, and a first path (43) connecting the first manifold and the first inlet. The first path includes a portion (44) of which a flow path cross-sectional area reduces toward the first inlet. The turbine exhaust gas flows into the manifold from the turbo pump and flows to the first inlet through the first path.

It is preferable that the gas introducing section includes a piping (41) connecting the turbo pump and the first manifold, an exhaust pipe (46) branched from the piping, and a valve (47) provided to the exhaust pipe.

It is preferable that the valve operates based on an altitude of a rocket including the rocket nozzle.

It is preferable that the gas introducing section includes a second gas inlet (55) provided to a second inner wall surface of the second stage nozzle, and a three-way valve (51). Each of the first gas inlet, the second gas inlet and the turbo pump is connected to the three-way valve. The second gas inlet injects the turbine exhaust gas as a film-like flow along the second inner wall surface.

It is preferable that the three-way valve switches between the first gas inlet and the second gas inlet to connect one of the first gas inlet and the second gas inlet to the turbo pump.

It is preferable that air is used as the gas.

It is preferable that the gas introducing section includes an air intake (62) provided to an outer wall surface of the first stage nozzle, an air path (61) connecting the air intake and the first gas inlet, and a slider (64) configured to open and close the air intake.

A control method for combustion gas flow in a rocket engine includes introducing gas into space (80) surrounded by a dual-bell nozzle (10). Combustion gas flows in the space. The dual-bell nozzle includes a first stage nozzle (20) bell-shaped and surrounding an upstream portion (81) of the space, and a second stage nozzle (30) bell-shaped and surrounding a downstream portion (82) of the space. The dual-bell nozzle has an inflection point (12) between the first stage nozzle and the second stage nozzle. In the introducing the gas, the gas is introduced into the space from a first gas inlet (45, 63) provided to a first inner wall surface of the first stage nozzle.

In the introducing the gas, it is preferable that flow rate of the gas is controlled based on an altitude of a rocket including the dual-bell nozzle.

It is preferable that turbine exhaust gas after driving a turbo pump (4, 5) is used as the gas. An exhaust pipe (46) is branched from a piping (41) for introducing the turbine exhaust gas from the turbo pump to the first gas inlet. A valve (47) is provided to the exhaust pipe. In the introducing the gas, it is preferable that the valve having been closed opens when it is detected that the altitude of the rocket exceeds a first altitude.

It is preferable that the rocket lifts off in a state that the valve is open. In the introducing the gas, it is preferable that the valve having been open closes when it is detected that the altitude of the rocket exceeds a second altitude lower than the first altitude.

It is preferable that turbine exhaust gas after driving a turbo pump (4, 5) is used as the gas. A second gas inlet (55) is provided to a second inner wall surface of the second stage nozzle. The second gas inlet injects the turbine exhaust gas as a film-like flow along the second inner wall surface. Each of the first gas inlet and the second gas inlet is connected to the turbo pump through a three-way valve (51). In introducing the gas, it is preferable that the three-way valve switches from a first state to allow the exhaust gas to flow to the first gas inlet to a second state to allow the exhaust gas to flow to the second gas inlet when it is detected that the altitude of the rocket exceeds a first altitude.

It is preferable that the rocket lifts off with the three-way valve being in the second state. In introducing the gas, it is preferable that the three-way valve switches from the second state to the first state when it is detected that the altitude of the rocket exceeds a second altitude lower than the first altitude.

It is preferable that air is used as the gas. The first gas inlet is connected through an air path (61) to an air intake (62) provided to an outer wall surface of the first stage nozzle. In introducing the gas, a slider (64) slides from a first position to open the air intake to a second position to close the air intake when it is detected that the altitude of the rocket exceeds a first altitude.

It is preferable that the rocket lifts off in a state that the slider is arranged at the second position. In introducing the gas, it is preferable that the slider slides from the second position to the first position when it is detected that the altitude of the rocket exceeds a second altitude lower than the first altitude.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A rocket nozzle comprising:
    a dual-bell nozzle; and
    a gas introducing section configured to introduce gas into a space surrounded by said dual-bell nozzle,
    wherein combustion gas flows in said space,
    said dual-bell nozzle includes:
    a first stage nozzle bell-shaped and surrounding an upstream portion of said space; and a second stage nozzle bell-shaped and surrounding a downstream portion of said space,
    said dual-bell nozzle has an inflection point between said first stage nozzle and said second stage nozzle,
    said gas introducing section includes a first gas inlet provided to a first inner wall surface of said first stage nozzle,
    said gas is introduced into said space from said first gas inlet,
    turbine exhaust gas after driving a turbo pump is used as said gas,
    said first gas inlet injects said gas parallel to said first inner wall surface adjacent said inflection point,
    said gas introducing section includes:
    a second gas inlet provided to a second inner wall surface of said second stage nozzle; and a three-way valve,
    each of said first gas inlet, said second gas inlet and said turbo pump is connected to said three-way valve, and
    said second gas inlet injects said turbine exhaust gas as a film-like flow along said second inner wall surface adjacent said inflection point, wherein said three-way valve switches between said first gas inlet and said second gas inlet to connect one of said first gas inlet and said second gas inlet to said turbo pump.

2. A control method for combustion gas flow in a rocket engine comprising;
    introducing gas into a space surrounded by a dual-bell nozzle, wherein combustion gas flows in said space, said dual-bell nozzle includes:
a first stage nozzle bell-shaped and surrounding an upstream portion of said space; and
a second stage nozzle bell-shaped and surrounding a downstream portion of said space,
said dual-bell nozzle has an inflection point between said first stage nozzle and said second stage nozzle,
said gas being introduced into said space from a first gas inlet provided to a first inner wall surface of said first stage nozzle,
injecting said gas from said first gas inlet parallel to said first inner wall surface adjacent said inflection point,
controlling a flow rate of said gas based on an altitude of said rocket engine,
turbine exhaust gas after driving a turbo pump is used as said gas,
a second gas inlet provided to a second inner wall surface of said second stage nozzle injects said gas as a film-like flow along said second inner wall surface adjacent said inflection point,
connecting each of said first gas inlet and said second gas inlet to said turbo pump through a three-way valve, and
switching said three-way valve from a first state to allow said gas to flow to said first gas inlet to a second state to allow said gas to flow to said second gas inlet when it is detected that said altitude of said rocket engine exceeds a first altitude.

3. The control method for combustion gas flow in a rocket engine according to claim 2 wherein said rocket lifts off with said three-way valve being in said second state, and
in said introducing said gas, said three-way valve switches from said second state to said first state when it is detected that said altitude of said rocket exceeds a second altitude lower than said first altitude.

4. A control method for combustion gas flow in a rocket engine comprising:
introducing gas into a space surrounded by a dual-bell nozzle, wherein turbine exhaust gas after driving a turbo pump is used as said gas,
wherein combustion gas flows in said space,
said dual-bell nozzle includes:
a first stage nozzle bell-shaped and surrounding an upstream portion of said space; and a second stage nozzle bell-shaped and surrounding a downstream portion of said space,
said dual-bell nozzle has an inflection point between said first stage nozzle and said second stage nozzle,
said gas being introduced into said space from a first gas inlet provided to a first inner wall surface of said first stage nozzle,
injecting said gas from said first gas inlet parallel to said first inner wall surface adjacent said inflection point,
said gas being introduced into said space from a second gas inlet provided to a second inner wall surface of said second stage nozzle, said second gas inlet injects said gas as a film like flow along said second inner wall surface adjacent said inflection point,
connecting each of said first gas inlet and said second gas inlet to said turbo pump through a three-way valve,
controlling a flow rate of said gas based on an altitude of said rocket engine,
switching said three-way valve from a first state to allow said turbine exhaust gas to flow to said first gas inlet to a second state to allow said turbine exhaust gas to flow to said second gas inlet when a first altitude is exceeded,
in said first state, said gas is introduced into said space to keep said combustion gas in a low expansion flow state and prevent said combustion gas from transiting to a high expansion flow state,
in said first state a flow of said combustion gas separates from said second inner wall surface of said second stage nozzle of said dual-bell nozzle at said inflection point when said combustion gas is in said low expansion flow state, and
in said second state a flow of said combustion gas separates from said second inner wall surface at a nozzle exit of said second stage nozzle when said combustion gas is in said high expansion flow state.

5. The control method for combustion gas flow in a rocket engine according to claim 4 wherein said rocket engine lifts off with said three-way valve being in said second state, and
in said introducing said gas, said three-way valve switches from said second state to said first state when said altitude of said rocket engine exceeds a second altitude lower than said first altitude.

* * * * *